United States Patent
Zehler et al.

(10) Patent No.: US 9,774,750 B1
(45) Date of Patent: Sep. 26, 2017

(54) SYSTEM AND METHOD FOR PRINTING DURING A PULL PRINTING SYSTEM FAILURE

(71) Applicant: Xerox Corporation, Norwalk, CT (US)

(72) Inventors: Peter J. Zehler, Penfield, NY (US); Lawrence W. Meyer, Fairport, NY (US); Rovil A. Andrade, Rochester, NY (US)

(73) Assignee: NORWALK, Norwalk, CT (US)

( * ) Notice: Subject to any disclaimer, the term of this patent is extended or adjusted under 35 U.S.C. 154(b) by 0 days.

(21) Appl. No.: 15/210,667

(22) Filed: Jul. 14, 2016

(51) Int. Cl.
  *H04N 1/00* (2006.01)
  *G06F 3/12* (2006.01)

(52) U.S. Cl.
  CPC ......... *H04N 1/0023* (2013.01); *G06F 3/1288* (2013.01); *G06F 3/1291* (2013.01); *G06F 3/1294* (2013.01); *H04N 1/00206* (2013.01); *H04N 1/00244* (2013.01); *H04N 1/00384* (2013.01)

(58) Field of Classification Search
  CPC .................................... H04N 1/0023
  USPC ....................................... 358/1.15
  See application file for complete search history.

(56) References Cited

U.S. PATENT DOCUMENTS

| | | | |
|---|---|---|---|
| 2011/0299122 A1* | 12/2011 | Kawakami | G06F 3/121 358/1.15 |
| 2012/0069394 A1* | 3/2012 | Ono | G06F 3/121 358/1.15 |
| 2012/0075665 A1* | 3/2012 | Sambe | G06F 3/1203 358/1.15 |
| 2012/0229846 A1* | 9/2012 | Hadano | G06F 3/1203 358/1.15 |

* cited by examiner

*Primary Examiner* — Jacky X Zheng

(57) ABSTRACT

A method, non-transitory computer readable medium and apparatus for printing in a pull printing system when a print server is unavailable are disclosed. For example, the method includes receiving a request to print a document, determining that the print server of the pull printing system is unavailable, providing one or more printers to print the document, receiving a selection of a printer from the one or more printers to print the document, transmitting the document to the printer that is selected for printing, determining that the print server is available, and transmitting an update message to the print server that includes the document that was printed, the printer that was selected and one or more print parameters associated with the document, wherein the print server synchronizes a print queue and a print history of the print server based on the update message.

20 Claims, 3 Drawing Sheets

SYSTEM AND METHOD FOR PRINTING DURING A PULL PRINTING SYSTEM FAILURE

The present disclosure relates generally to printing in a managed print network and, more particularly, to a system and method for printing during a pull printing system failure.

BACKGROUND

Some companies and enterprises use managed print networks to monitor and control print jobs of the employees or users. Monitoring and controlling print jobs allows the company to control costs by eliminating personal print jobs at the office, suggesting alternative print parameters for a print job, routing print jobs to cheaper printers, allocate costs for each print job to the appropriate department, and the like.

However, one disadvantage of a managed print network is that a user may be unable to print when the managed print network fails. Currently, when a managed print network fails there are only two options. One option is to halt all printing until the managed print network is brought back online. This option is undesirable because some documents may need to be printed and cause a bottleneck for certain work flows or processes in the company.

A second option is to allow users to print directly to an available printer, but without tracking the print jobs. This option is undesirable because print jobs that are not tracked can lead to higher costs for the company. In addition, the company may be unable to allocate costs for the print jobs that are not tracked.

SUMMARY

According to aspects illustrated herein, there are provided a method, non-transitory computer readable medium and apparatus for printing in a pull printing system when a print server is unavailable. One disclosed feature of the embodiments is a method that receives a request to print a document, determines that the print server of the pull printing system is unavailable, provides one or more printers to print the document, receives a selection of a printer from the one or more printers to print the document, transmits the document to the printer that is selected for printing, determines that the print server is available, and transmits an update message to the print server that includes the document that was printed, the printer that was selected and one or more print parameters associated with the document, wherein the print server synchronizes a print queue and a print history of the print server based on the update message.

Another disclosed feature of the embodiments is a non-transitory computer-readable medium having stored thereon a plurality of instructions, the plurality of instructions including instructions which, when executed by a processor, cause the processor to perform operations that receive a request to print a document, determine that the print server of the pull printing system is unavailable, provide one or more printers to print the document, receive a selection of a printer from the one or more printers to print the document, transmit the document to the printer that is selected for printing, determine that the print server is available, and transmit an update message to the print server that includes the document that was printed, the printer that was selected and one or more print parameters associated with the document, wherein the print server synchronizes a print queue and a print history of the print server based on the update message.

Another disclosed feature of the embodiments is an apparatus comprising a processor and a computer-readable medium storing a plurality of instructions which, when executed by the processor, cause the processor to perform operations that receive a request to print a document, determine that the print server of the pull printing system is unavailable, provide one or more printers to print the document, receive a selection of a printer from the one or more printers to print the document, transmit the document to the printer that is selected for printing, determine that the print server is available, and transmit an update message to the print server that includes the document that was printed, the printer that was selected and one or more print parameters associated with the document, wherein the print server synchronizes a print queue and a print history of the print server based on the update message.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for printing in a pull printing system when a print server is unavailable. As discussed above, documents may be protected for various different reasons using various different methods. For example, some companies and enterprises use managed print networks to monitor and control print jobs of the employees or users. Monitoring and controlling print jobs allows the company to control costs by eliminating personal print jobs at the office, suggesting alternative print parameters for a print job, routing print jobs to cheaper printers, allocate costs for each print job to the appropriate department, and the like. However, one disadvantage of a managed print network is that a user may be unable to print when the managed print network fails.

Embodiments of the present disclosure provide a novel method and apparatus that allows a user to print documents in a managed print environment of a pull printing system even when a print server is unavailable. For example, as noted above, when the print server is unavailable, the user would previously be unable to print documents or the print jobs would not be tracked. As a result, the print server would not be able to accurately charge, or account for, each print job to a particular department.

The present disclosure provides a constrained mode subsystem executed on a print client to track each print job locally when the print server is unavailable. For example, the constrained mode subsystem may track print parameters associated with each print job, provide conversion of the document into a print ready document using a driver associated with a printer that is selected to print the document, and the like.

When the print server is available, the constrained mode subsystem may then send an update message to the print server that includes print parameters associated with the print jobs. The print server may update a print queue and a print history based on the update message. As a result, the print jobs do not have to be resent by the user when the printer server is available again and the print server may maintain accurate accounting metrics for each print job.

Figure 1:
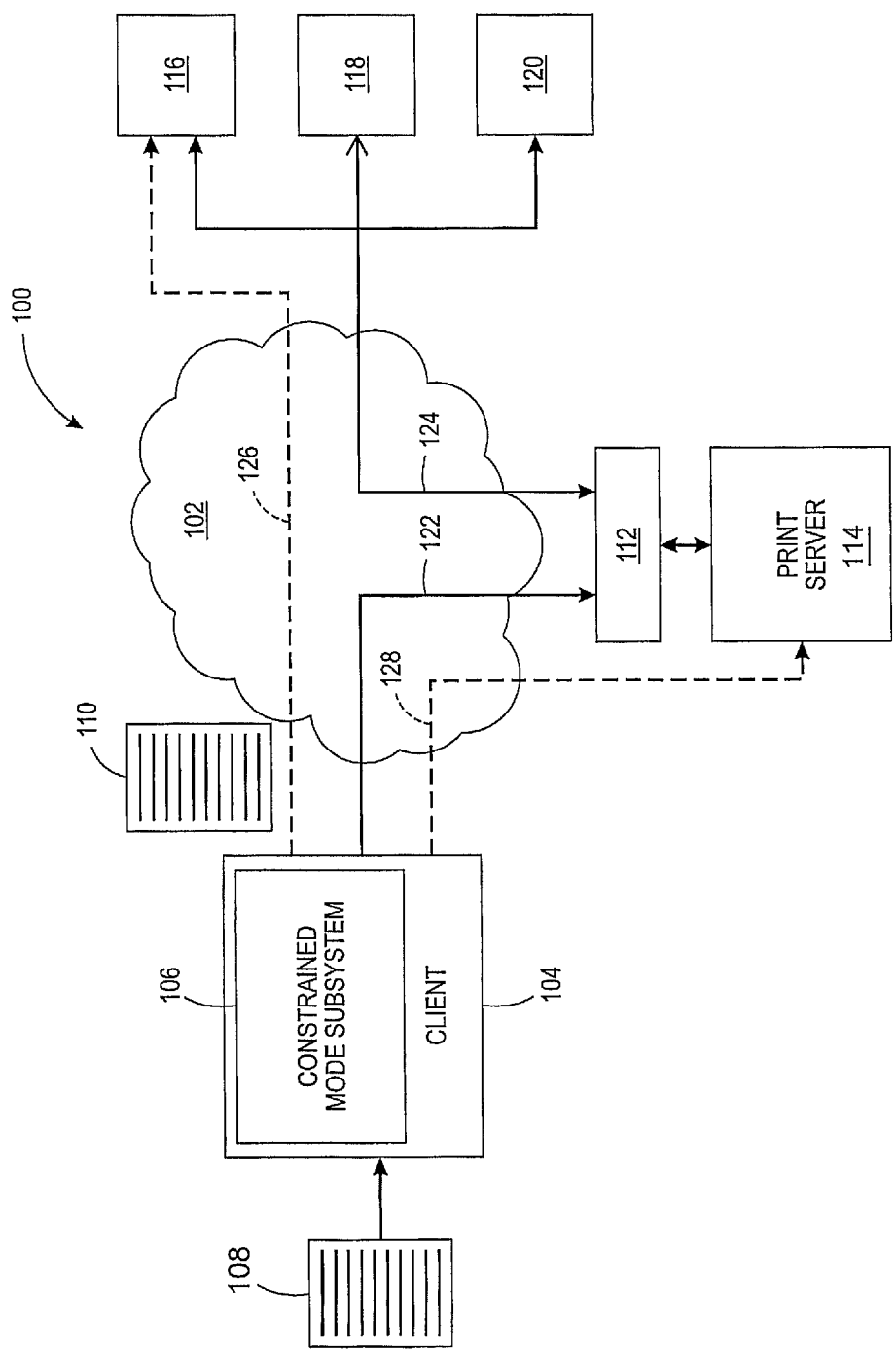
FIG. 1 illustrates an example system of the present disclosure.

FIG. 1 illustrates an example system 100 of the present disclosure. In one embodiment, the system 100 includes a client 104, a print server 114 and one or more printers 116, 118 and 120. The client 104, the print server 114 and the one or more printers 116, 118 and 120 may communicate over an Internet Protocol (IP) network 102. The one or more printers 116, 118 and 120 may communicate with the client 104 and/or the print server 114 via a wired or a wireless connection to the IP network 102.

The one or more printers 116, 118 and 120 may be any type of printer or multi-function device (MFD). Although three printers 116, 118 and 120 are illustrated in FIG. 1, it should be noted that any number of printers may be deployed.

In one embodiment, the IP network 102 may be a wired or wireless communication network. The IP network 102 may be a local area network (LAN) (e.g., within an enterprise location, a single building, and the like) or a wide area network (WAN) (e.g., across multiple enterprise locations, multiple buildings, and the like). The IP network 102 has been simplified for ease of explanation, but may include additional network elements not shown (e.g., additional access networks, gateways, routers, switches, border elements, firewalls, and the like).

In one embodiment, the client 104 may be an endpoint device having a memory and a processor. The client 104 may be an endpoint device such as a laptop computer, a desktop computer, a tablet computer, a smart phone, and the like. Although only a single client 104 is illustrated in FIG. 1, it should be noted that any number or clients 104 may be deployed.

In one embodiment, the client 104 may store and generate a document 108. The client 104 may then select and transmit the document 108 to the print server 114 to be printed.

In one embodiment, the print server 114 may be a dedicated machine having a processor and a memory for managing print jobs and managing accounting metrics associated with each print job. Although a single print server 114 is illustrated in FIG. 1, a plurality of print servers 114 may be deployed.

In one embodiment, a load balancer 112 may be in communication with the IP network 102 and the print servers 114. The system 100 may be a pull printing managed print environment. In other words, a user may send the document 108 to be printed via the print server 114. For example, the document 108 may be transmitted via a communication path 122 to the load balancer 112. The load balancer 112 may then assign the document 108 to an available print server to be printed (e.g., the print server 114).

The print server 114 may convert the document 108 into a print ready file that can be printed on one of the printers 116, 118 or 120 that is selected. The user may then go to any one of the selected printers 116, 118 or 120 and print the document 108. For example, the print job may be pulled from the print server 114 via a communication path 124 when the user initiates the print job on the selected printer 116, 118 or 120.

The print server 114 may include a print queue and a print history. The print queue may store pending print jobs that are sent from one or more different clients 104. The print history may include a list of print jobs that are completed and print parameters associated with the print job. For example, the print parameters may include a name of the user that submitted the print job request, a date and time the print job was completed, a printer that was selected, a color type (e.g., color or black and white), a number of copies that were printed, a number of pages of the print job, a type of media that was used to print the document 108, and the like. As a result, the print server 114 may manage the account metrics for each print job and charge the print job to a particular department or user of the enterprise in the managed print environment.

One drawback of the managed print environment, such as the system 100, is that when the print server 114 is not available the user may not be able to print the document 108. The print server 114 may be unavailable due to a variety of different reasons such as failure, maintenance, and the like. One option, as discussed above, may be to print outside of the managed print environment, but then print jobs may not be tracked and the accounting for each print job may be lost.

To resolve these technical issues, one embodiment of the present disclosure may deploy a constrained mode subsystem (CMS) application 106 on the client 104. The CMS application 106 may periodically communicate with the print server 114 (e.g., via a ping message) to detect whether the print server 114 is available. As long as the print server 114 is available, the document 108 may be printed via a "normal" path via the communication paths 122 and 124.

However, when the CMS application 106 determines that the print server 114 is unavailable (e.g., due to failure of the IP network 102 or the print server 114, or being taken down for maintenance) the user may still be able to print the document 108. In one embodiment, the CMS application 106 may provide a list of one or more printers 116, 118 and 120 for the user to select to print the document 108. In one embodiment, the list of the one or more printers 116, 118 and 120 may be based on tracking the printers 116, 118 and 120 that the user has previously selected.

In another embodiment, the list of the one or more printers 116, 118 and 120 may be based on a communication capability. For example, the list of the one or more printers 116, 118 and 120 may be printers that can directly communicate with the client 104. To illustrate, the client 104 may only have wireless communication capability with the IP network 102. Some printers may only be connected to the IP network 102 via a wired network. However, the printers 116, 118 and 120 may have wireless communication capability with the IP network 102. As a result, the printers 116, 118 and 120 that are provided may be printers that are able to communicate directly with the client 104 over a wireless communication via the IP network 102.

The CMS application 106 may receive a selection of one of the printers 116, 118 and 120 (e.g., the printer 116). The CMS application 106 may then invoke a driver associated with the selected printer 116. The driver may be a software application that can be used by the CMS application 106 and/or the client 104 to convert the document 108 into a print read file 110 that the selected printer can understand and print. The CMS application 106 may then transmit the print read file 110 to the selected printer 116 via a communication path 126. The CMS application 106 may store each document 108, or print job, that was printed and the associated print parameters while printing is completed during the time period that the print server 114 is unavailable.

At a later time, the CMS application 106 may detect that the print server 114 is available again. As a result, the CMS application 106 may send an update message to the print server 114 via a communication path 128. The update message may include the print jobs that were completed and the associated print parameters. As a result, the print server 114 may synchronize the print queue and the print history of the print server based on the update message. In one embodiment, where multiple print servers 114 are deployed, the CMS application 106 may send the update message to each print server 114 to allow all of the print servers 114 to synchronize the respective print queues and print histories.

For example, any print jobs that were in the print queue that were re-submitted and completed may be removed from the print queue. In addition, the print server 114 may store the accounting metrics associated with each print job based on the associated print parameters. As a result, users may be able to still print documents 108 while the print server 114 is unavailable, while still maintaining all of the benefits of a managed print environment. In addition, users are not required to resubmit the print jobs after the print server 114 is available again. As a result, the present disclosure provides a back-up solution to printing in a managed print environment that is efficient and seamless when the print server 114 is unavailable for any reason.

Once the print queue and the print history are synchronized by the print server 114, the print server 114 may send a notification to the CMS application 106 that the synchronization is complete. As a result, the CMS application 106 may allow documents 108 selected for printing to be sent to the load balancer 112 and the print server 114 again via the communication path 122.

In one embodiment, the CMS application 106 may also still maintain security print options that are available with the managed print environment via the print server 114. For example, the CMS application 106 may provide an option to the user to apply a secure print feature for the document 108 to be printed. The secure print feature may be a passcode associated with the document 108 that can be entered via a keypad or user interface of the printer 116, 118 or 120 when the user pulls the print job.

Figure 2:
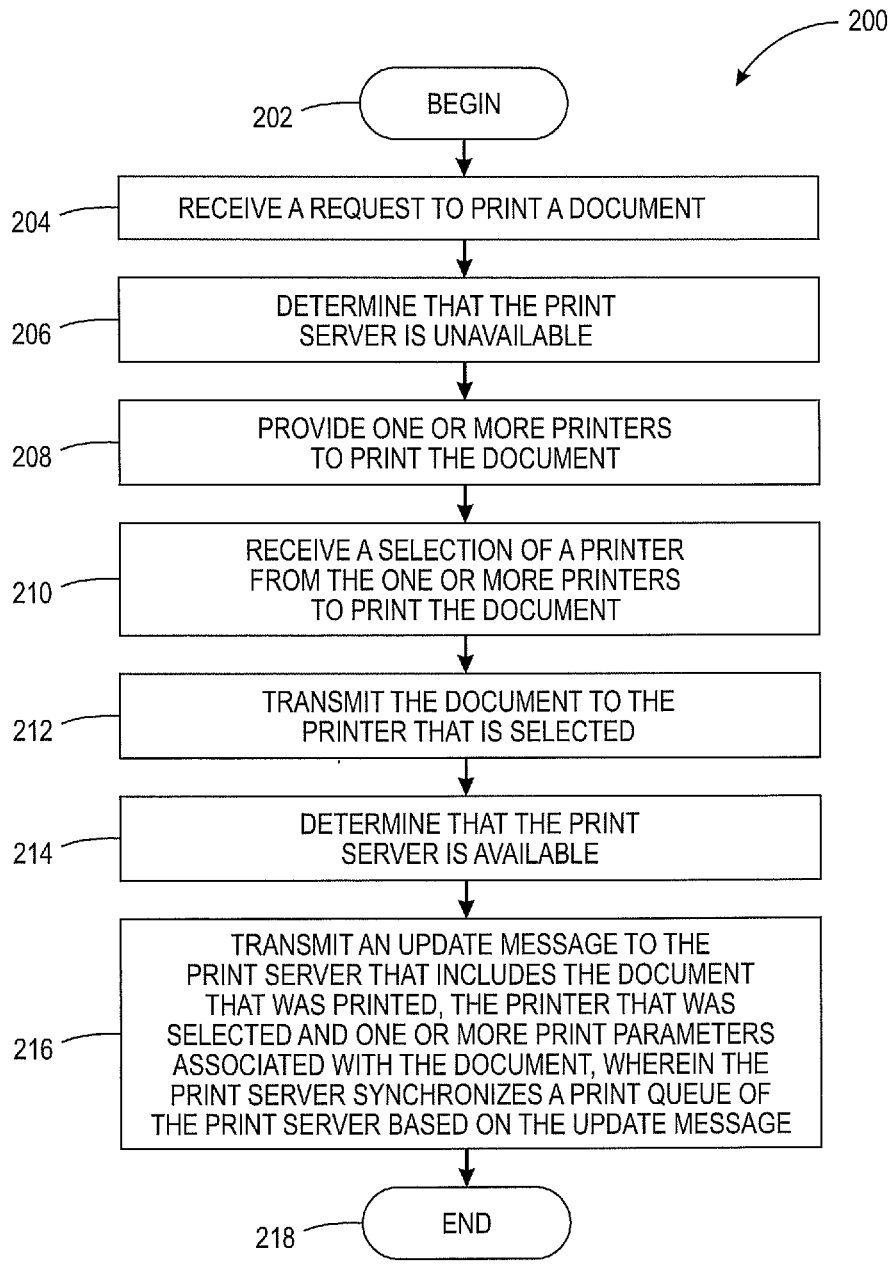
FIG. 2 illustrates a flowchart of an example method for printing in a pull printing system when a print server is unavailable.
Figure 3:
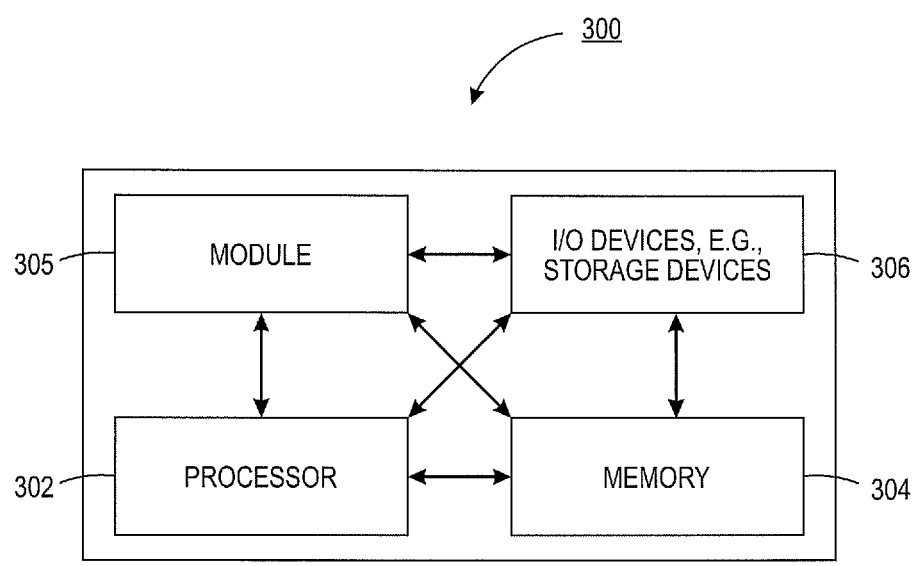
FIG. 3 illustrates a high-level block diagram of a computer suitable for use in performing the functions described herein.

FIG. 2 illustrates a flowchart of an example method 200 for printing in a pull printing system when a print server is unavailable. In one embodiment, one or more steps or operations of the method 200 may be performed by the apparatus 100 or a computer as illustrated in FIG. 3 and discussed below.

At block 202, the method 200 begins. At block 204, the method 200 receives a request to print a document. For example, a user may generate, create or save a document in memory on a client or endpoint device. The user may select the document on the client to be printed.

At block 206, the method 200 determines that the print server is unavailable. For example, a CMS application on the endpoint device of a user may occasionally or periodically (e.g., every 10 seconds, every minute, and the like) ping the print server to determine if the print server is online and available. If no response is received or the print server cannot be reached, the CMS application may determine that the print server is unavailable. The print server may be unavailable for a variety of different reasons including malfunctioning, temporarily shut down for maintenance, a loss of connection to the IP network, and the like.

It should be noted that if the print server is available, the document may be transmitted to the print server to be printed under a "normal" operation of the managed print environment. For example, the print server may format the document to a print ready file using a driver associated with a printer that is selected by the user.

At block 208, the method 200 provides one or more printers to print the document. In one embodiment, the list of one or more printers may be based on printers that were previously used by the user. In one embodiment, the printers that are provided may be based on a proximity or location relative to the user's location. In another embodiment, the printers that are provided may be based on a communication capability. For example, the list of the one or more printers may be printers that can directly communicate with the client. To illustrate, the client may only have wireless communication capability with the IP network. Some printers may only be connected to the IP network via a wired network. However, the list of printers that are provided may have wireless communication capability with the IP network. As a result, the list of printers that are provided may be printers that are able to communicate directly with the client over a wireless communication via the IP network.

At block 210, the method 200 receives a selection of a printer from the one or more printers to print the document. The user may select one of the printers that are provided via a user interface of the client.

At block 212, the method 200 transmits the document to the printer that is selected. In one embodiment, the client may invoke a driver associated with the printer that is selected. The driver may be used to convert the document into a print ready file that can be understood and printed by the printer that is selected.

It should be noted that the print server is unavailable at block 212 and that the document is sent directly to the printer that is part of a managed print environment. In other words, the document that is to be printed by-passes the print server and is sent directly to the printer to be printed.

In one embodiment, the CMS application may track, or store, the documents that are printed and the print parameters associated with each document that was printed. For example, the print parameters may include a name of the user that submitted the print job request, a date and time the print job was completed, a printer that was selected, a color type (e.g., color or black and white), a number of copies that were printed, a number of pages of the print job, a type of media that was used to print the document, and the like.

In one embodiment, secure print features may still be applied to the document for printing. For example, the CMS application may provide an option to the user to apply a secure print feature for the document to be printed. The secure print feature may be a passcode associated with the document that can be entered via a keypad or user interface of the printer that is selected when the user pulls the print job.

At block 214, the method 200 determines that the print server is available. For example, the CMS application that is stored in memory and executed by the processor of the client may continuously ping the print server to determine whether the print server is available or unavailable. At some point, the print server may be available again and ready for receiving print job requests.

In one embodiment, the method 200 may continue to use the CMS application to provide available printers and route documents for printing directly to a selected printer while the print server remains unavailable. In other words, blocks 204-212 may be repeated until the print server becomes available again.

At block 216, the method 200 transmits an update message to the print server that includes the document that was printed, the printer that was selected and the one or more print parameters associated with the document, wherein the print server synchronizes a print queue of the print server based on the update message. For example, the print server may use the update message to identify the print job requests that were in the print queue before the print server became unavailable and suppress the print job requests in the print queue using normal job processing methods to avoid printing the print job request again.

In addition, the print parameters may be used to track accounting metrics. For example, the appropriate user, or department of the user, may be charged correctly for the print jobs that were completed while the print server was unavailable. Thus, the method 200 allows documents to be printed in a managed print environment without losing the benefits associated with the managed print environment.

In one embodiment, the print server may send a notification to the CMS application to notify the CMS application that the print queue and the print history was synchronized successfully via the update message. After the notification is received, the CMS application may allow documents to be routed for printing via the print server again.

In one embodiment, the method 200 may be repeated for each request to print a document that is received. At block 218, the method 200 ends.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application.

FIG. 3 depicts a high-level block diagram of a computer that can be transformed into a machine that is dedicated to perform the functions described herein. As a result, the embodiments of the present disclosure improve the operation and functioning of an endpoint device to submit a print job for printing in a pull printing system during failure of the pull printing system, as disclosed herein.

As depicted in FIG. 3, the computer 300 comprises one or more hardware processor elements 302 (e.g., a central processing unit (CPU), a microprocessor, or a multi-core processor), a memory 304, e.g., random access memory (RAM) and/or read only memory (ROM), a module 305 for printing in a pull printing system when a print server is unavailable, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire methods) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for printing in a pull printing system when a print server is unavailable (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for printing in a pull printing system when a print server is unavailable (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing in a pull printing system when a print server is unavailable, comprising:
   receiving, by a processor, a request to print a document;
   determining, by the processor, that the print server of the pull printing system is unavailable;
   providing, by the processor, one or more printers to print the document while the print server is unavailable;
   receiving, by the processor, a selection of a printer from the one or more printers to print the document while the print server is unavailable;
   transmitting, by the processor, the document to the printer that is selected for printing while the print server is unavailable;

determining, by the processor, that the print server that was unavailable is available after the providing, the receiving and the transmitting;

generating, by the processor, an update message that includes the document that was printed, the printer that was selected and one or more print parameters associated with the document; and transmitting, by the processor, the update message to the print server wherein the update message causes the print server to synchronize a print queue and a print history of the print server based on the update message.

2. The method of claim 1, wherein the providing the one or more printers is based on a list of recently used printers.

3. The method of claim 1, wherein the providing the one or more printers is based on a capability of the one or more printers to directly communicate with the processor.

4. The method of claim 1, further comprising:
invoking, by the processor, a driver associated with the printer that is selected; and
creating, by the processor, a printer ready file of the document for the printer that is selected via the driver.

5. The method of claim 1, further comprising:
providing, by the processor, an option to add a secure print feature for the document to be printed.

6. The method of claim 5, wherein the secure print feature comprises a passcode entered at the printer that is selected to print the document.

7. The method of claim 1, further comprising:
receiving, by the processor, a notification from the print server that the print queue and the print history are synchronized successfully via the update message.

8. The method of claim 1, wherein the one or more print parameters comprise a user that printed the document, a date the document was printed, a time the document was printed, a color parameter associated with the document, a number of pages, a number of copies and a type of print media.

9. A non-transitory computer-readable medium storing a plurality of instructions, which when executed by a processor, cause the processor to perform operations for printing in a pull printing system when a print server is unavailable, the operations comprising:
receiving a request to print a document;
determining that the print server of the pull printing system is unavailable;
providing one or more printers to print the document while the print server is unavailable;
receiving a selection of a printer from the one or more printers to print the document while the print server is unavailable;
transmitting the document to the printer that is selected for printing while the print server is unavailable;
determining that the print server is available that was unavailable is available after the providing, the receiving and the transmitting;
generating an update message that includes the document that was printed, the printer that was selected and one or more print parameters associated with the document; and
transmitting the update message to the print server wherein the update message causes the print server to synchronize a print queue and a print history of the print server based on the update message.

10. The non-transitory computer-readable medium of claim 9, wherein the providing the one or more printers is based on a list of recently used printers.

11. The non-transitory computer-readable medium of claim 9, wherein the providing the one or more printers is based on a capability of the one or more printers to directly communicate with the processor.

12. The non-transitory computer-readable medium of claim 9, the operations further comprising:
invoking a driver associated with the printer that is selected; and
creating a printer ready file of the document for the printer that is selected via the driver.

13. The non-transitory computer-readable medium of claim 9, the operations further comprising:
providing an option to add a secure print feature for the document to be printed.

14. The non-transitory computer-readable medium of claim 13, wherein the secure print feature comprises a passcode entered at the printer that is selected to print the document.

15. The non-transitory computer-readable medium of claim 9, the operations further comprising:
receiving a notification from the print server that the print queue and the print history are synchronized successfully via the update message.

16. The non-transitory computer-readable medium of claim 9, wherein the one or more print parameters comprise a user that printed the document, a date the document was printed, a time the document was printed, a color parameter associated with the document, a number of pages, a number of copies and a type of print media.

17. A method for printing in a pull printing system when a print server is unavailable, comprising:
receiving, by a processor, a request to print a first document on a first printer;
transmitting, by the processor, the first document to the print server for printing on the first printer, wherein the print server manages a plurality of print requests to each one of a plurality of printers of the pull printing system via a load balancer and tracks accounting metrics associated with each one of the plurality of print requests;
storing, by the processor, the first printer that was selected to print the first document;
receiving, by the processor, a request to print a second document;
determining, by the processor, that the print server of the pull printing system is unavailable;
providing, by the processor, one or more printers to print the second document that include the first printer while the print server is unavailable;
receiving, by the processor, a selection of the first printer from the one or more printers to print the second document while the print server is unavailable;
transmitting, by the processor, the second document to the first printer that is selected for printing while the print server is unavailable;
determining, by the processor, that the print server that was unavailable is available after the providing, the receiving and the transmitting;
generating, by the processor, an update message that includes the second document that was printed, the first printer that was selected and one or more print parameters associated with the second document; and
transmitting, by the processor, the update message to the print server, wherein the update message causes the print server to synchronize a print queue and a print history of the print server based on the update message.

18. The method of claim 17, further comprising:
invoking, by the processor, a driver associated with the first printer that is selected; and creating, by the processor, a printer ready file of the second document for the first printer that is selected via the driver.

19. The method of claim 17, further comprising:

providing, by the processor, an option to add a secure print feature for the second document to be printed.

20. The method of claim 17, further comprising:

receiving, by the processor, a notification from the print server that the print queue and the print history are synchronized successfully via the update message.

\* \* \* \* \*

UNITED STATES PATENT AND TRADEMARK OFFICE
CERTIFICATE OF CORRECTION

PATENT NO.         : 9,774,750 B1
APPLICATION NO.    : 15/210667
DATED              : September 26, 2017
INVENTOR(S)        : Peter J. Zehler, Lawrence W. Meyer and Rovil A. Andrade It is certified that error appears in the above-identified patent and that said Letters Patent is hereby corrected as shown below:

On the Title Page

(73) after Assignee: delete "NORWALK" and insert -- Xerox Corporation --.

Signed and Sealed this
Twentieth Day of February, 2018

Andrei Iancu
*Director of the United States Patent and Trademark Office*